Nov. 6, 1951 M. BEAN ET AL 2,574,238
PLASTER MIXING MACHINE
Filed June 29, 1946 19 Sheets-Sheet 5

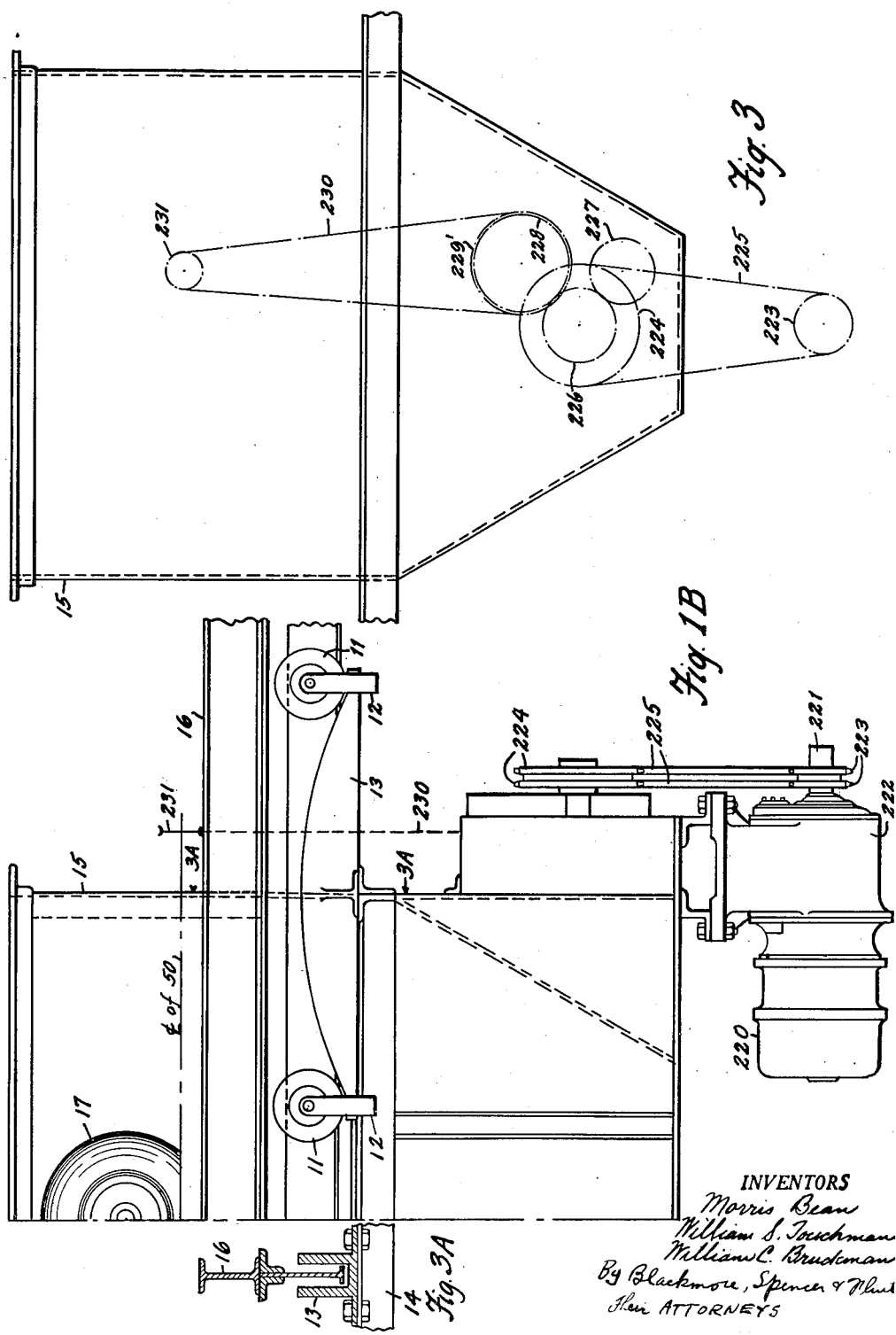

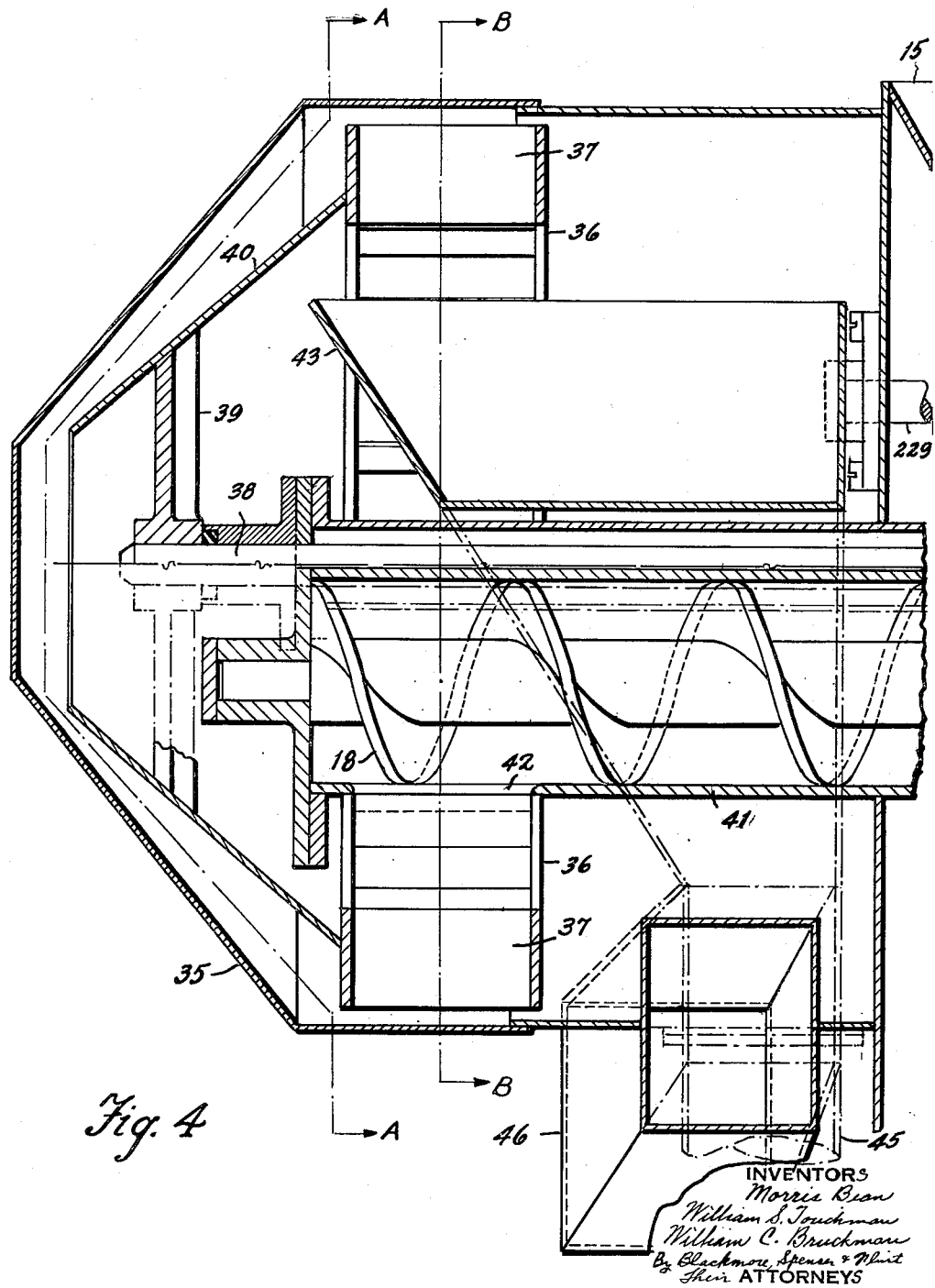

INVENTORS
Morris Bean
William S. Touchman
William C. Bruckman
By Blackmore, Spencer & Pleut
their ATTORNEYS Nov. 6, 1951    M. BEAN ET AL    2,574,238
PLASTER MIXING MACHINE
Filed June 29, 1946    19 Sheets-Sheet 12

INVENTORS
Morris Bean
William S. Torchman
William C. Bruckman
By Blackmore, Spencer & Flint
their ATTORNEYS

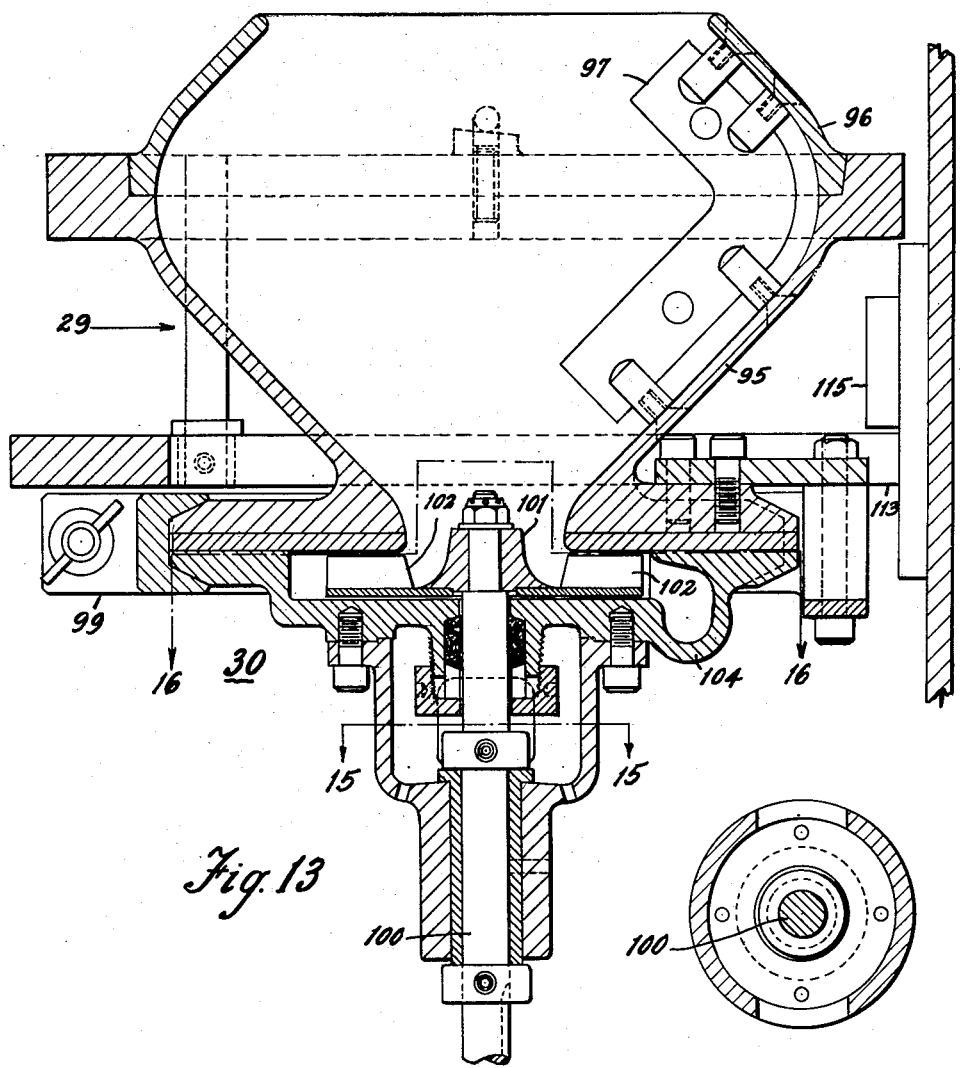
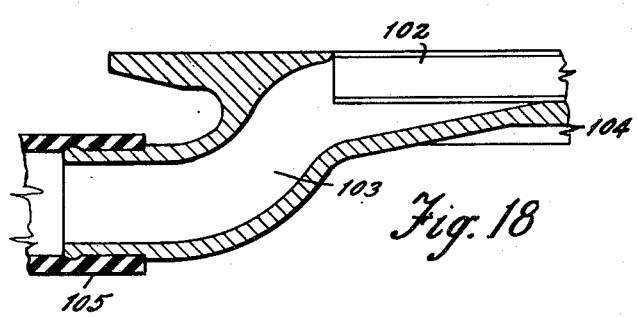

Nov. 6, 1951  M. BEAN ET AL  2,574,238
PLASTER MIXING MACHINE
Filed June 29, 1946  19 Sheets-Sheet 14

INVENTORS
Morris Bean
William S. Touchman
William C. Bruckman
by Blackmore, Spence & Flint
ATTORNEYS Nov. 6, 1951 M. BEAN ET AL 2,574,238
PLASTER MIXING MACHINE
Filed June 29, 1946 19 Sheets-Sheet 15
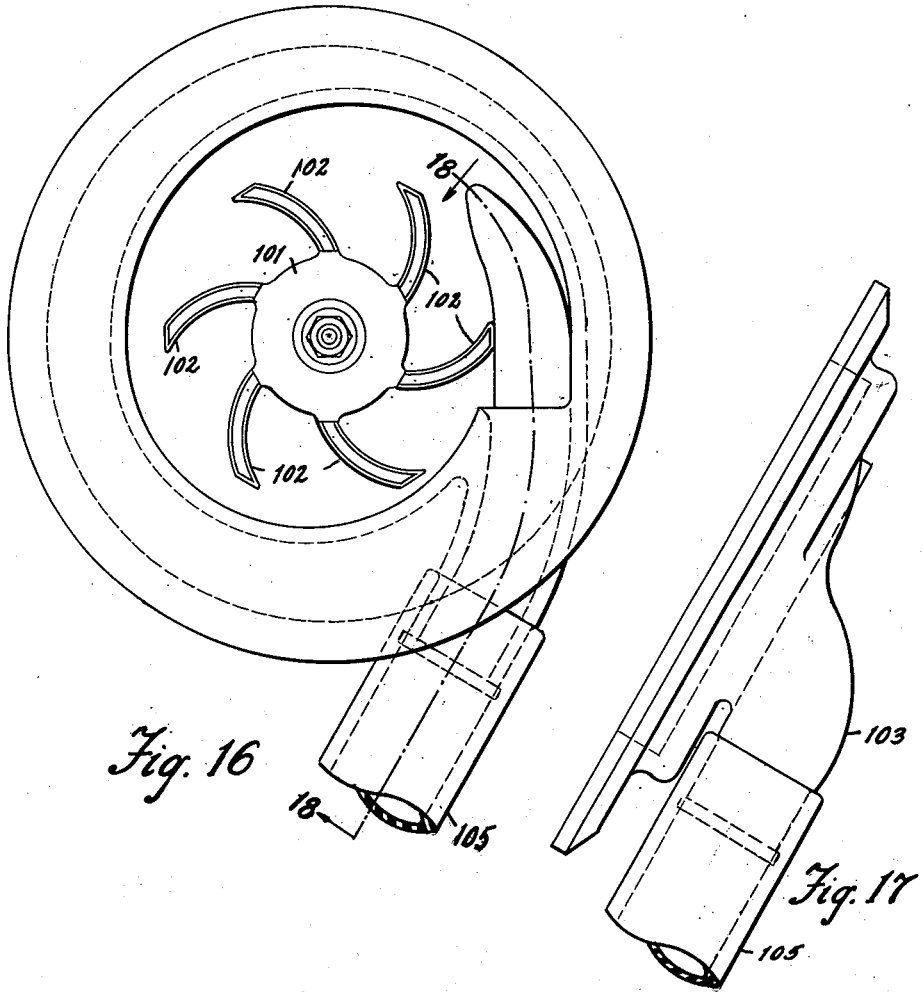
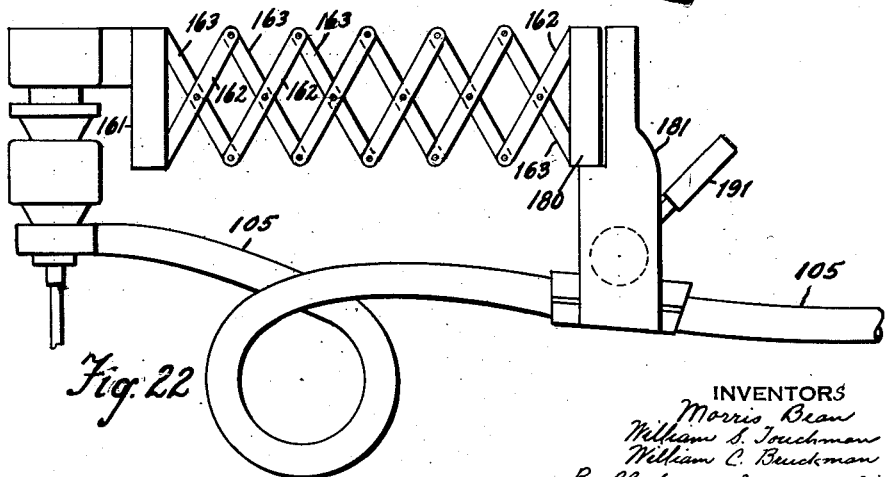
INVENTORS
Morris Bean
William S. Touchman
William C. Bruckman
By Blackmore, Spencer & Whit
Their ATTORNEYS

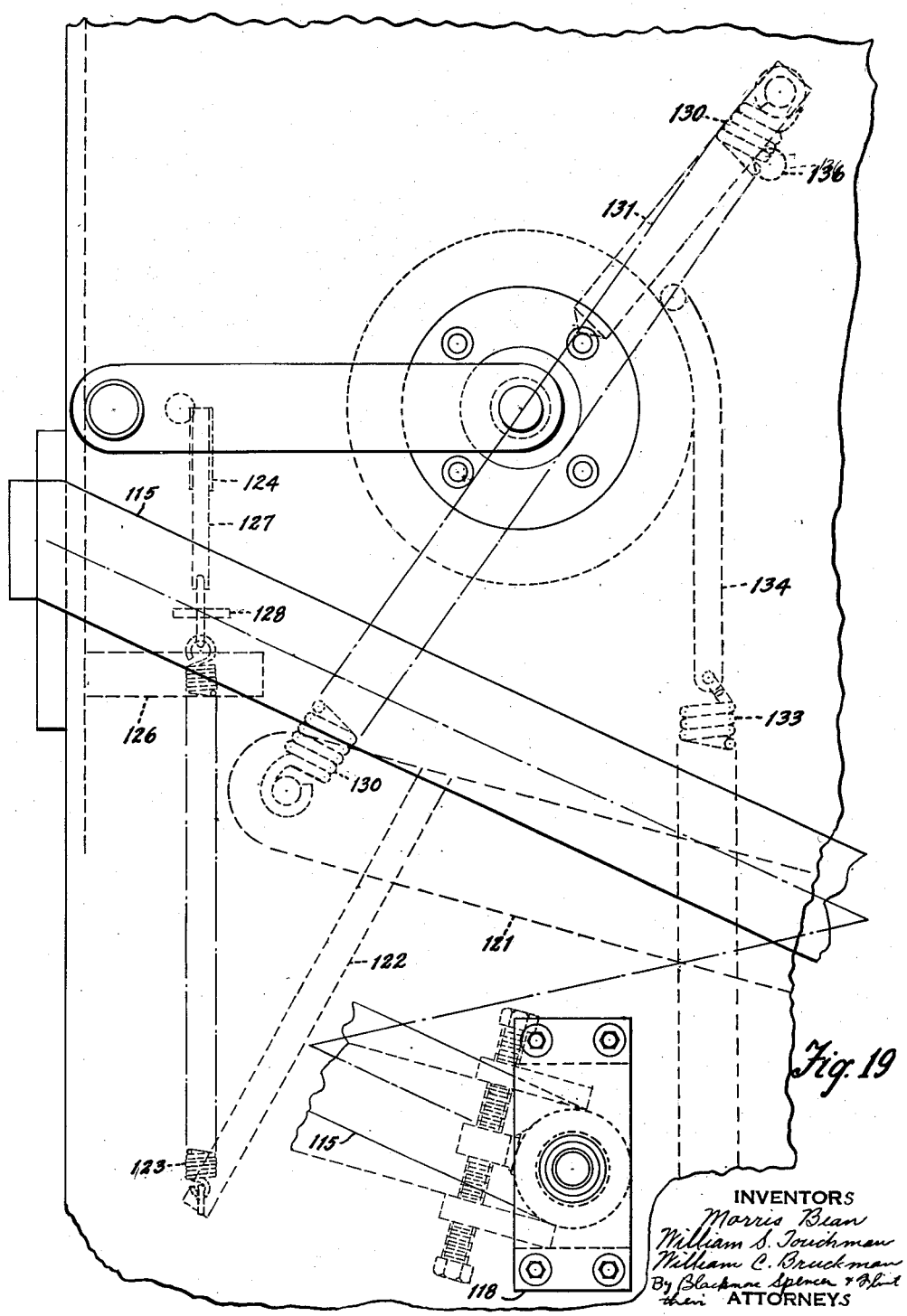

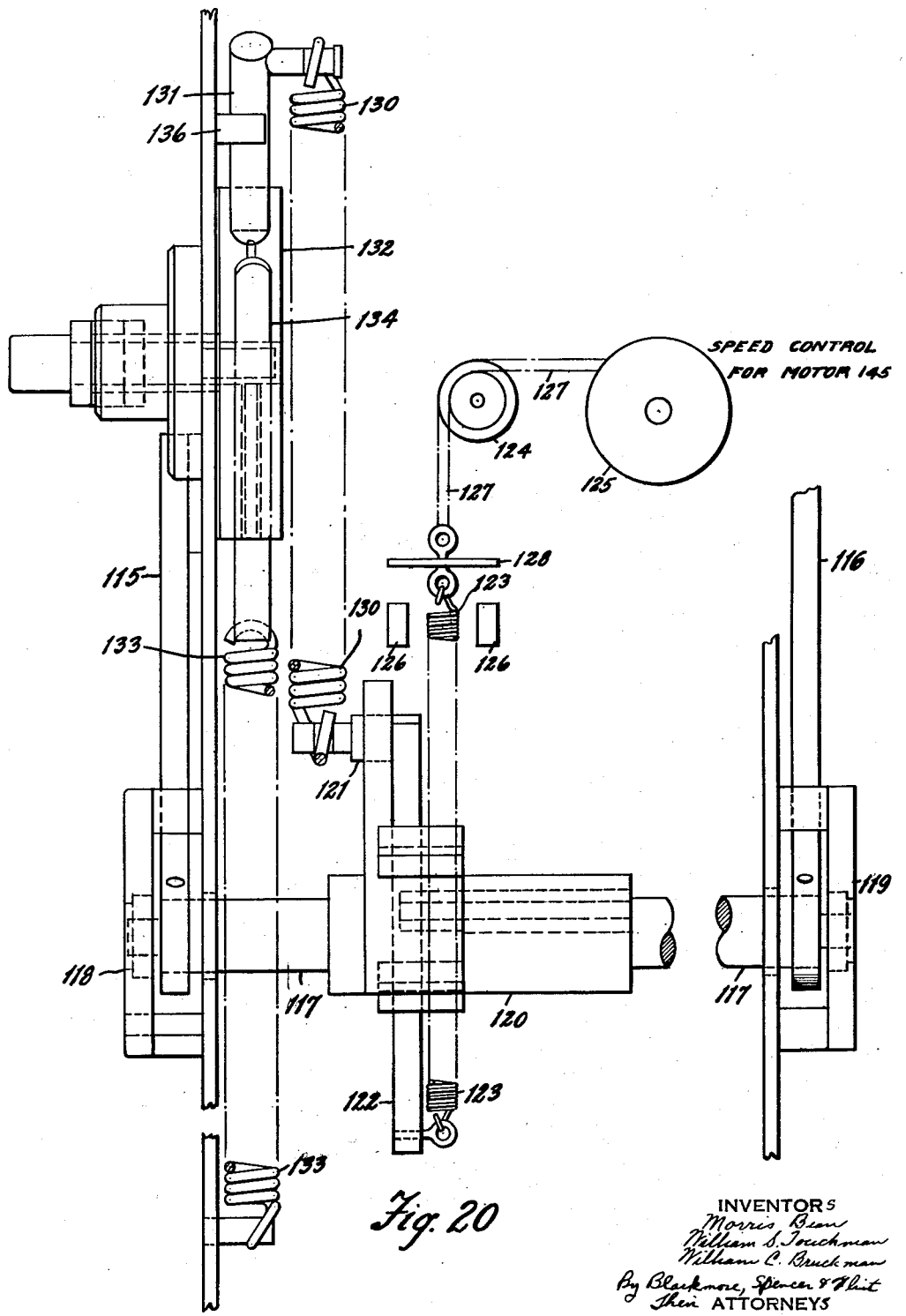

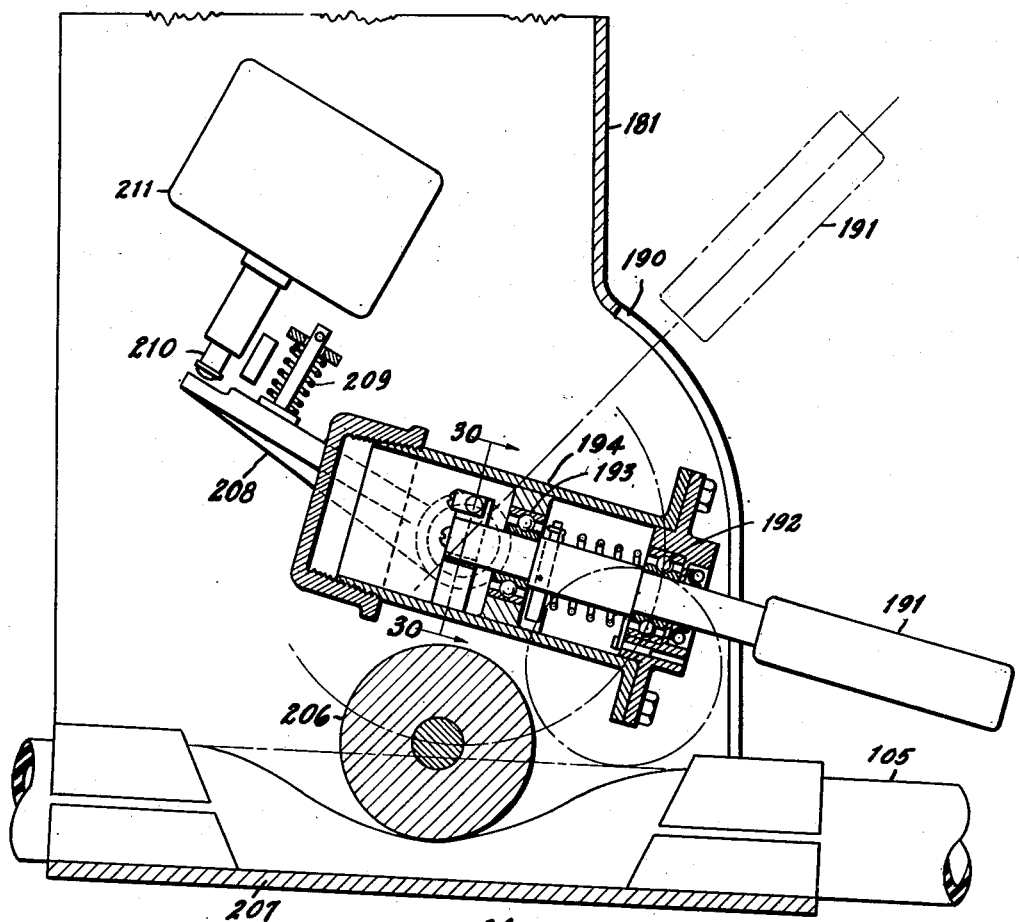
Fig. 29
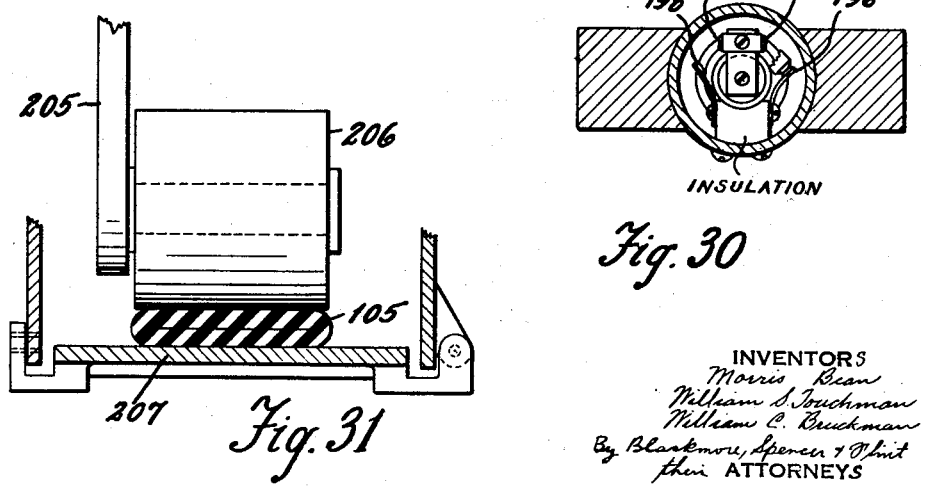
Fig. 30
Fig. 31
INVENTORS
Morris Bean
William S Touchman
William C Bruckman
By Blackmore, Spencer & Flint
their ATTORNEYS Patented Nov. 6, 1951

2,574,238

UNITED STATES PATENT OFFICE 2,574,238

PLASTER MIXING MACHINE

Morris Bean and William S. Touchman, Yellow Springs, Ohio, and William C. Bruckman, Bergenfield, N. J., assignors to General Motors Corporation, Detroit, Mich., a corporation of Delaware Application June 29, 1946, Serial No. 680,454

7 Claims. (Cl. 259—154)

1

The invention relates to a plaster mixing machine especially adapted for use in the formation of plaster of Paris bonded molds and cores.

In forming molds or cores in which plaster of Paris is used as the bonding agent it is important that the water and dry plaster be supplied in just the right proportions at all times as otherwise the plaster will not have the required strength or will be otherwise faulty for the intended purpose. Because of the speed with which the slurry sets it is also important that once the slurry is formed in the plaster mixing machine that it be caused to flow therefrom before it has a chance to set in the machine. The above conditions are some of the factors that have to be taken into account in a machine of this sort. The primary object of the invention is to provide an improved machine for mixing plaster and water and feeding the slurry thus formed to molds or core boxes, especially a machine of this type that is continuous in operation.

Reference is herewith made to the accompanying drawings showing a machine in accordance with one embodiment of the invention.

In the drawings:

Figs. 1A and 1B together are a side elevational view with parts broken away of the main portion of a plaster mixing machine in accordance with the invention.

Figure 3 is a view looking toward the left in Figure 1B showing diagrammatically driving means for certain parts.

Figure 3A is a sectional view on line 3A—3A in Figure 1B.

Figure 4 is a sectional view of a plaster fluffing unit taken substantially on line X—X—X—X in Figure 2.

2

Figure 8:
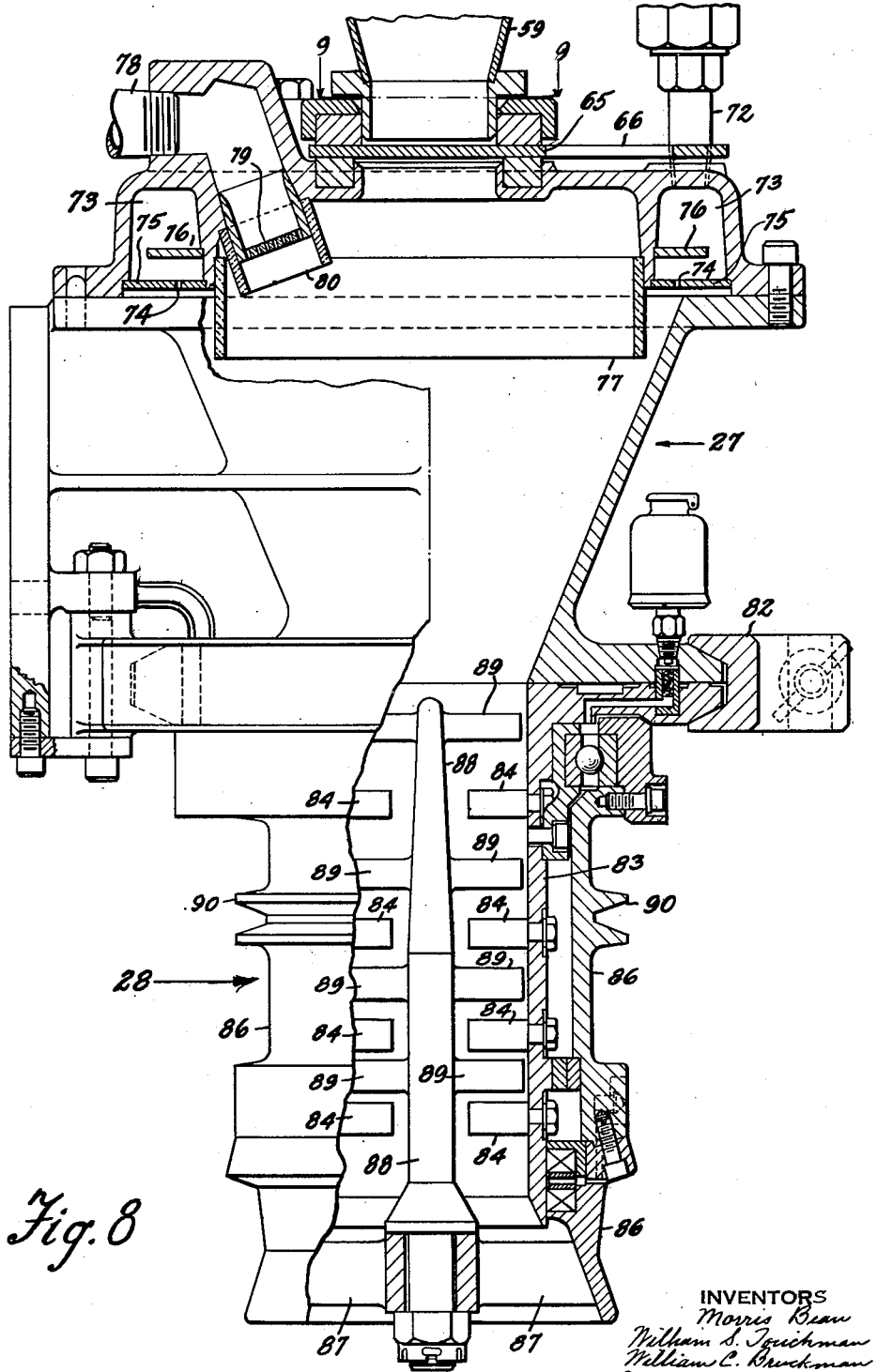
Figure 8 is an elevational and partial sectional view of a unit located immediately below the metering unit of Figures 6 and 7 and showing a wet cone and mixing unit for intimately mixing water with the dry plaster mix.
Figure 9:
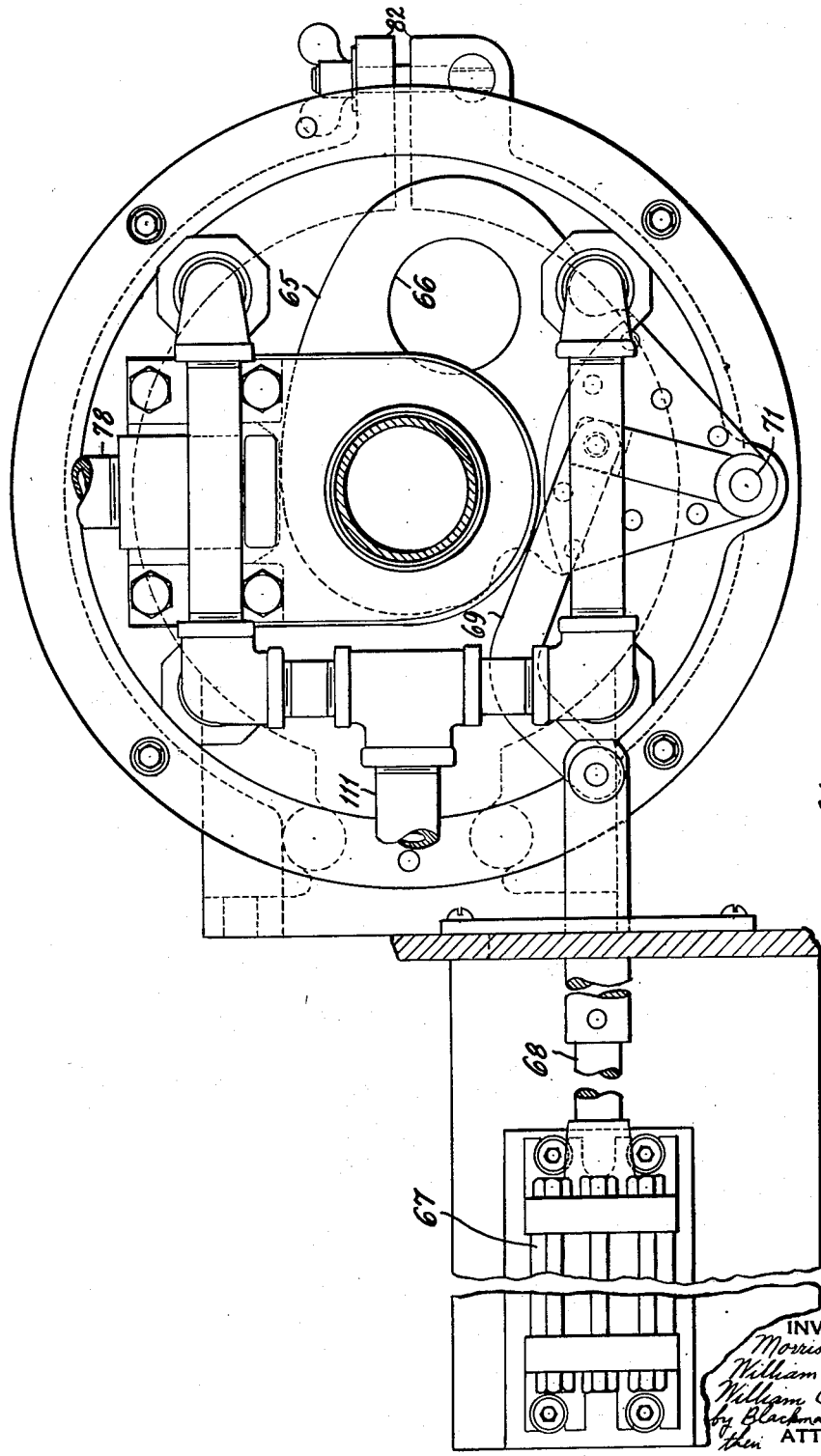

Figure 9 is a view substantially on line 9—9 in Figure 8 showing a slide gate and operating means therefor for controlling flow of dry plaster to the wet cone unit and also illustrating means through which water enters the wet cone unit.

Figure 10:
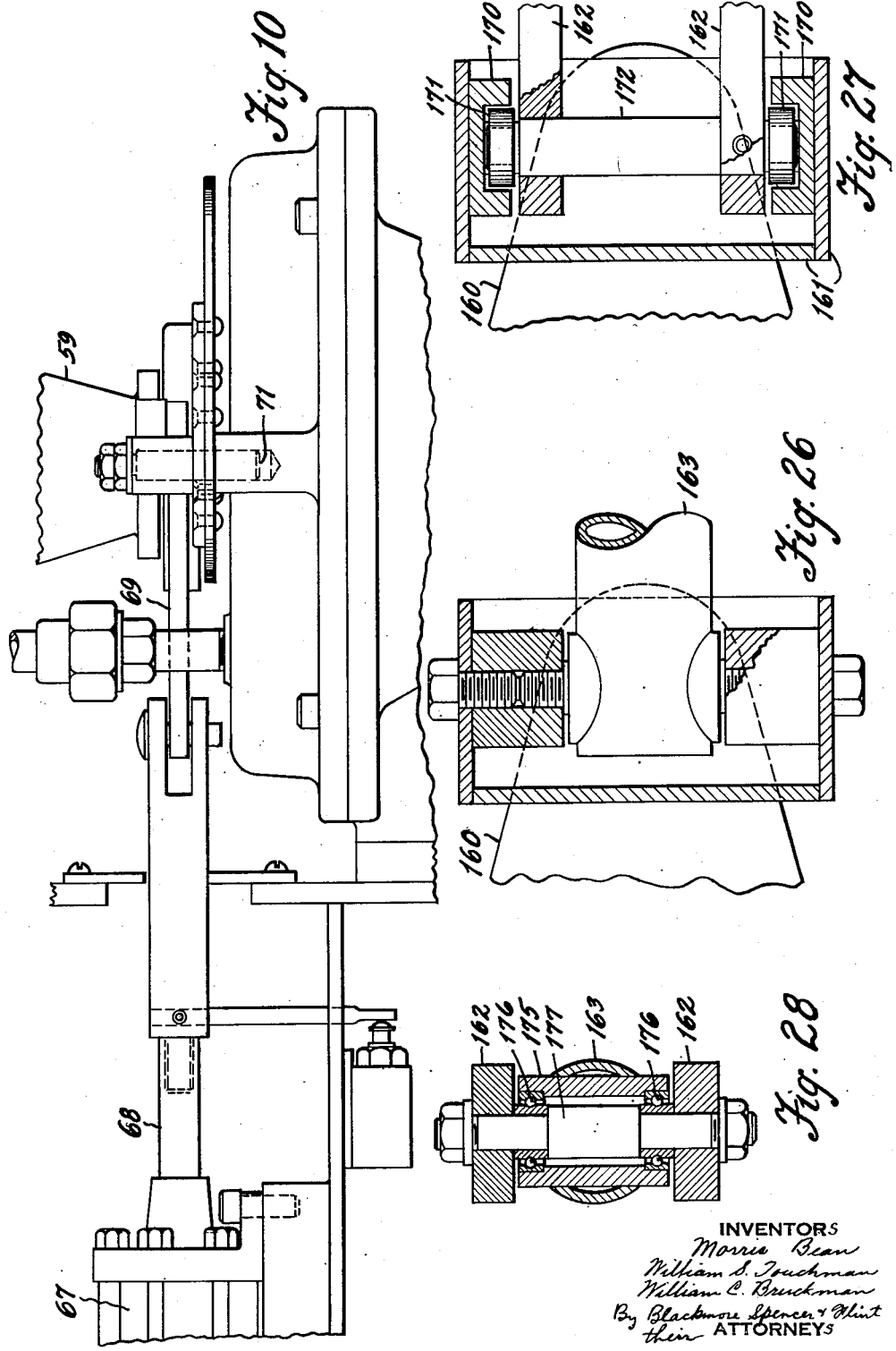

Figure 10 is a fragmentary elevational view illustrating means for operating the slide gate illustrated in Figure 9.

Figure 11:
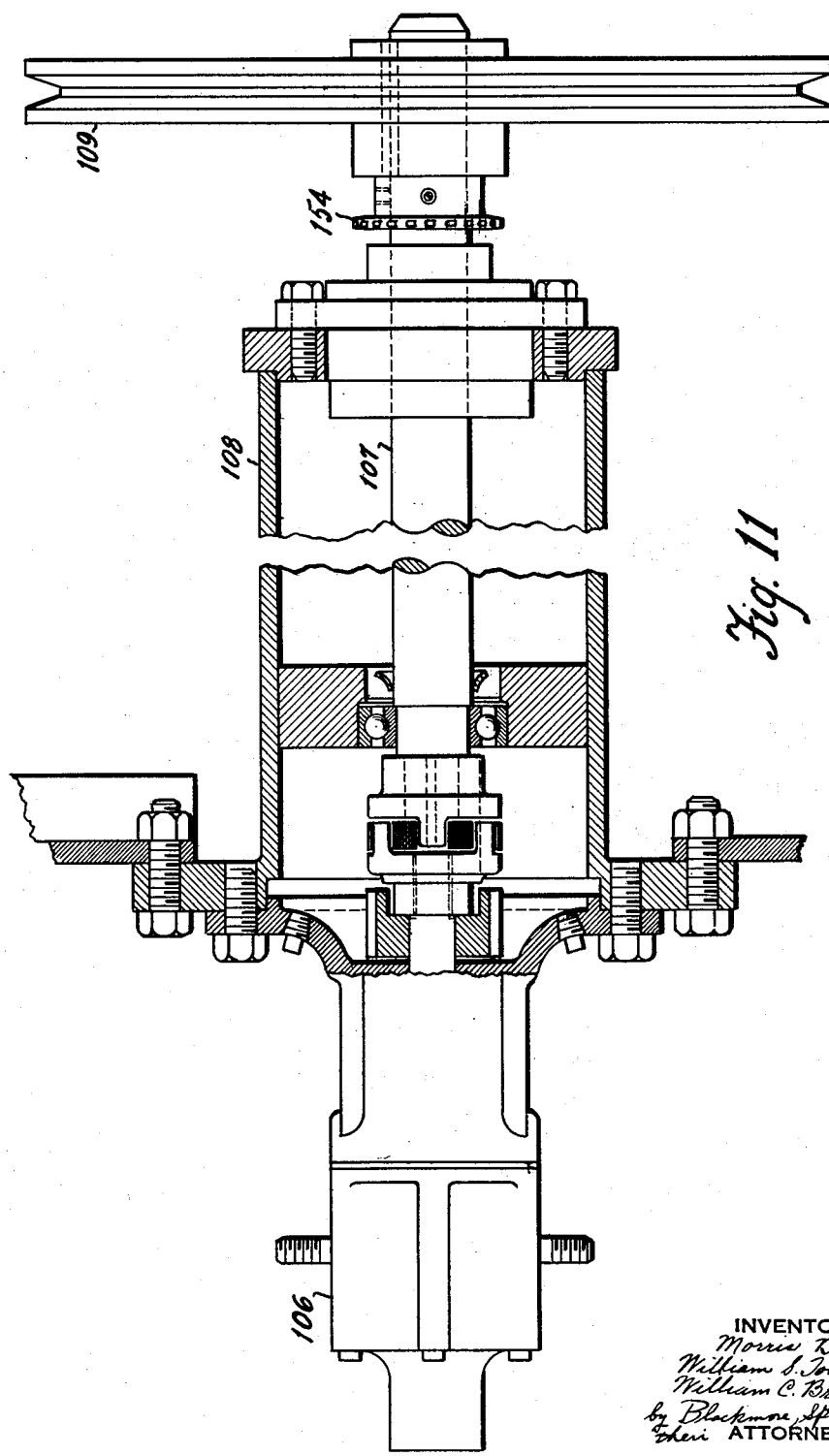

Figure 11 is a view with parts broken away and in section of a gear pump, mounting means and drive therefor for feeding a metered amount of water to the wet cone.

Figure 12:
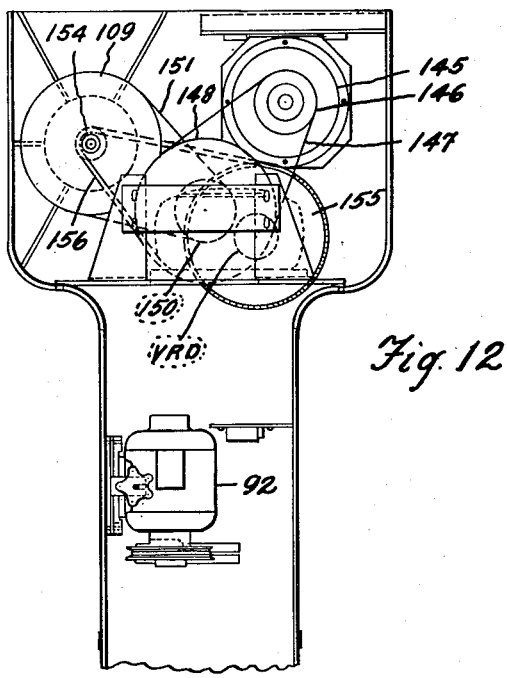

Figure 12 is a view illustrating driving means for the gear pump for metering water and for the metering wheel for feeding dry plaster.

Figure 14:
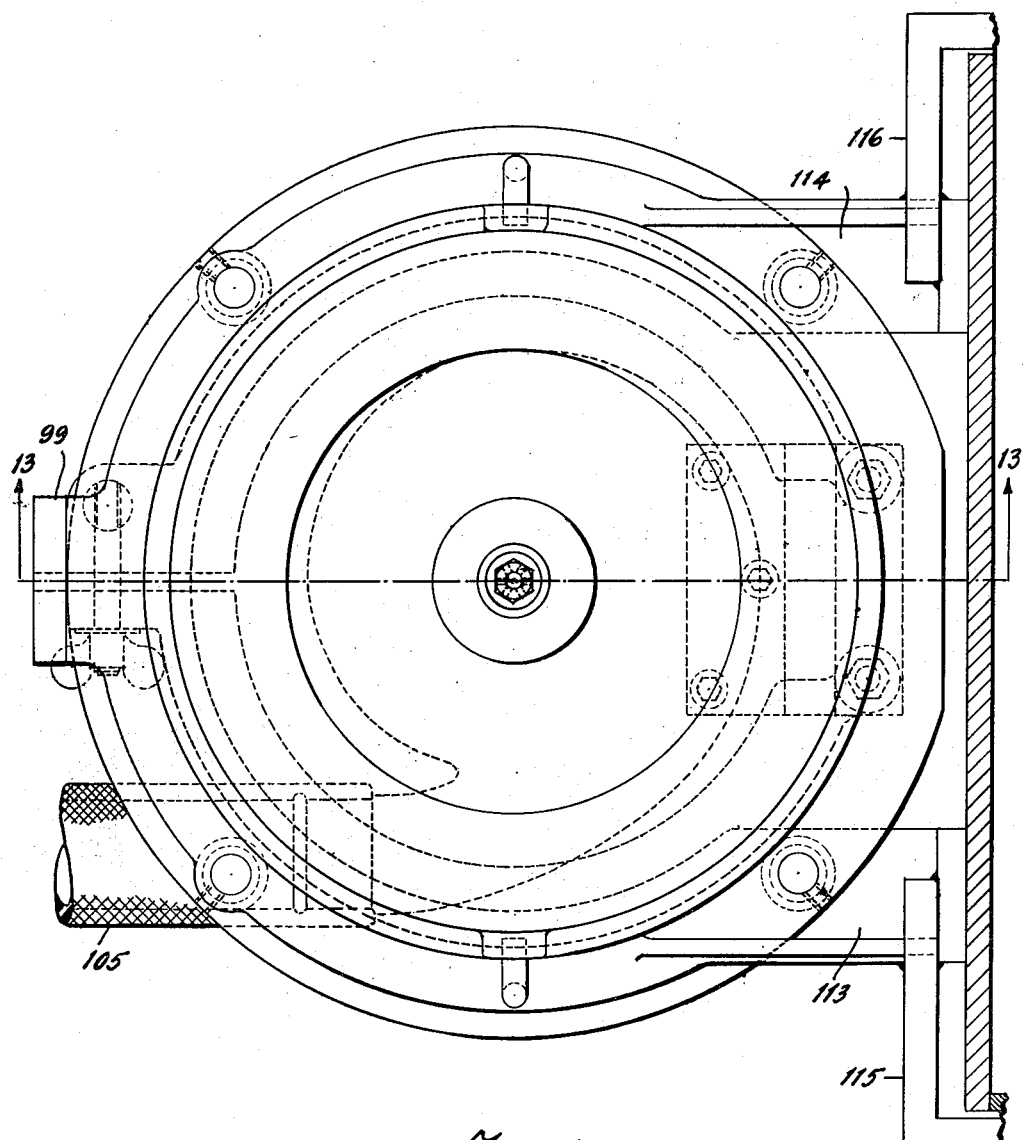

Figure 13 is a sectional view substantially on line 13—13 in Fig. 14 showing a chamber located immediately below the mixing unit adapted to receive the slurry from the mixing unit and a slurry pump for feeding the slurry from the bottom of the chamber.

Figure 14 is a top plan view showing the slurry receiving chamber and means for removably securing together the slurry receiving chamber and slurry pump and showing mounting means for these units.

Figure 15 is a sectional view of a detail on line 15—15 of Figure 13.

Figure 16 is a top plan view of the slurry pump taken on line 16—16 in Figure 13.

Figure 17 is a rotated elevational view of the device of Figure 16.

Figure 18 is a sectional view substantially on line 18—18 in Figure 16.

Figure 19 is an elevational view with parts broken away illustrating means for supporting the slurry chamber and diagrammatically illustrating control means operated by movement thereof for controlling speed of the motor driving the water and plaster metering devices.

Figure 20 is an end view of the device of Figure 19 taken at a right angle with respect to Figure 19.

Figure 21:
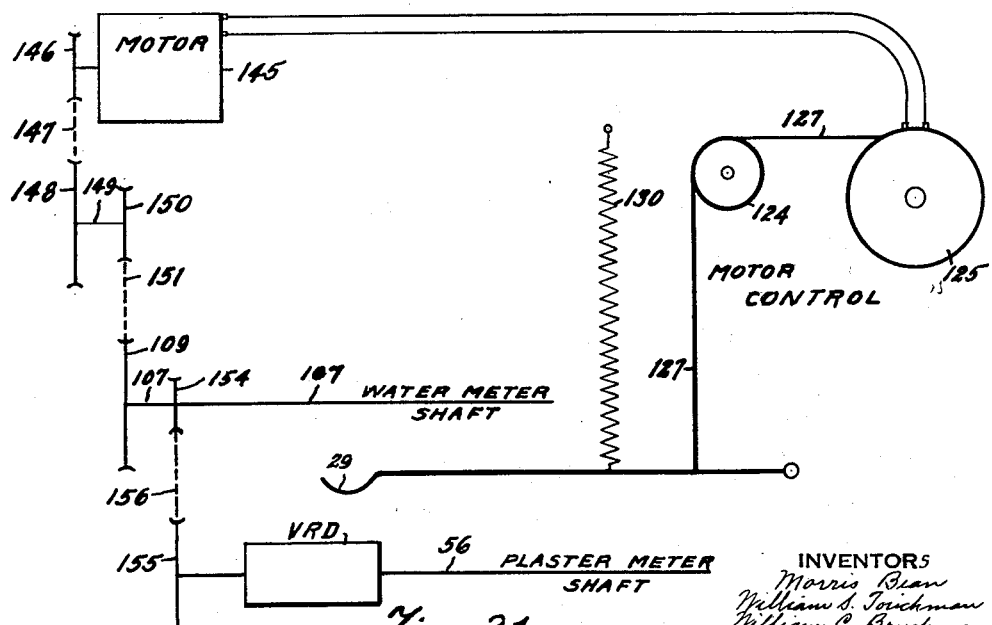

Figure 21 is a diagrammatic view illustrating the motor means driving the water and plaster metering devices and illustrating means for controlling the speed of rotation of the motor as the weight of slurry in the slurry chamber increases or decreases.

Figure 22 is a diagrammatic showing of a rotatable and extensible boom connected at one end to the frame of the machine and showing a hose supported by the boom and means for controlling flow of plaster through the hose.

Figure 23:
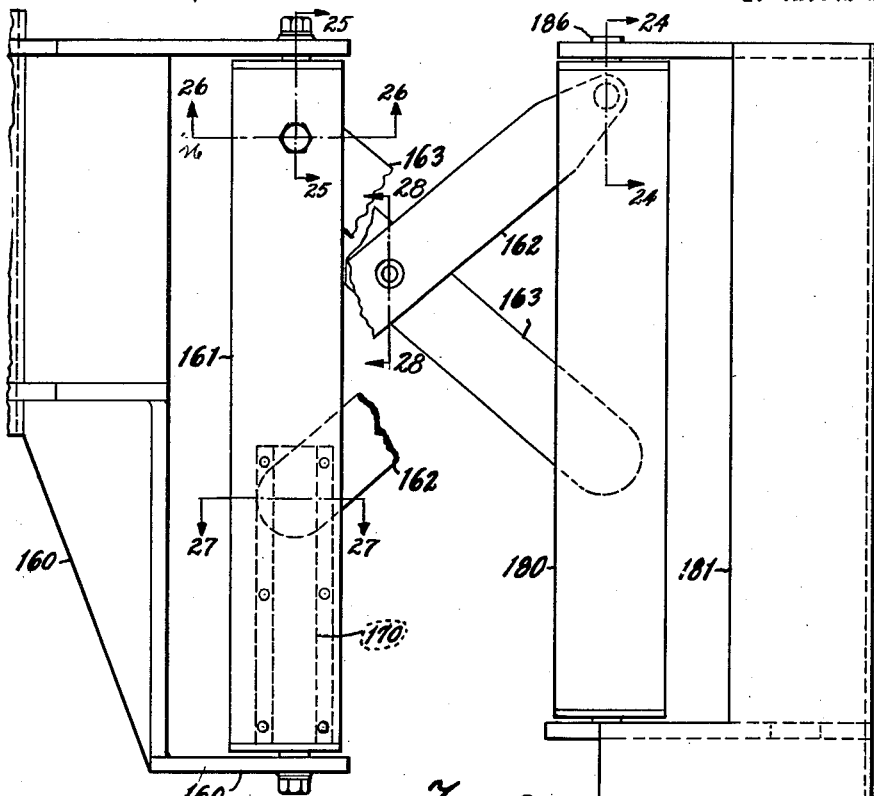

Figure 23 is an elevational view with parts broken away showing a rotatable and extensible boom for carrying hose, wires and controls and means for supporting the same.

Figure 24:
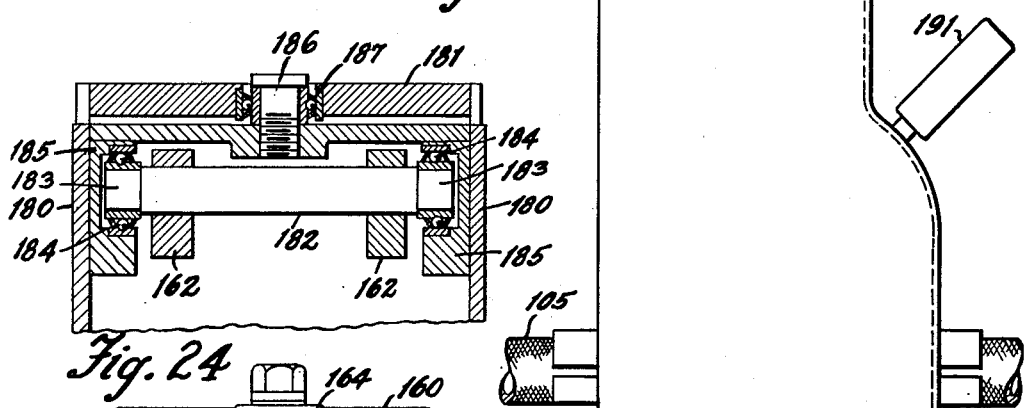

Figure 24 is a sectional view on line 24—24 in Figure 23.

Figure 25:
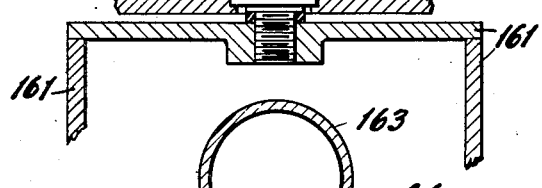

Figure 25 is a sectional view on line 25—25 in Figure 23.

Figure 26 is a sectional view on line 26—26 in Figure 23.

Figure 27 is a sectional view on line 27—27 in Figure 23.

Figure 28 is a sectional view substantially on line 28—28 in Figure 23.

Figure 29 is a fragmentary sectional view of control means carried by the extensible boom shown in Figures 22 and 23.

Figure 30 is a sectional view on line 30—30 in Figure 29.

Figure 31 is a sectional view illustrating the manner in which the pivotally supported roller of Figure 29 clamps a rubber hose to shut off flow of the slurry passing through the hose.

*General description*

The machine illustrated in the drawings comprises a relatively large hopper adapted to carry a supply of the dry plaster comprising plaster of Paris, sand and other components making up the dry plaster mix. The machine is carried by an overhead track and is movable back and forth on the track by means driven by an electric motor. The machine is equipped with controls including switch means whereby the motor may be actuated to move the machine to a position underneath an overhead loading bin (not shown) for filling the machine hopper and for moving the machine in a path between the mold or core boxes to be filled with the wet plaster or slurry.

In the hopper adjacent the bottom is a helical screw for feeding the dry plaster from the hopper to a fluffing wheel something similar to a water wheel. The wheel picks up the dry plaster, carries it to the top of the wheel and drops it into a chute from where it falls into a chamber below the wheel. Excess fluffed plaster is picked up by an elevator and returned to the supply hopper. The means for fluffing the plaster is intended to make a unit volume of the same as light as possible and to insure that the unit volume will always be of the same weight.

Immediately below the chamber filled with fluffed plaster is a rotating metering wheel. The metering wheel feeds a fixed amount of the dry plaster mix for each revolution. The plaster drops from the bottom of the metering chamber to a cone-shaped chamber. In the bottom of the cone-shaped chamber is a slide gate actuated by an air cylinder. When the machine is in normal operation the slide gate is open and the dry plaster enters a wet-cone chamber. At the top of the wet-cone chamber the required amount of water is fed. A gear pump feeds the water to the wet-cone chamber and meters the amount of water required for the dry plaster. The gear pump and plaster metering wheel are geared together and driven by the same direct current electric motor. Thus, as the motor speeds up or slows down the proportions of dry plaster and water fed to the wet-cone chamber remain the same.

From the wet-cone chamber the water and plaster pass to a mixing chamber comprising fixed and rotary blades, the rotary blades being driven by an electric motor. The rotary parts are rotated at high speed by the motor and the plaster and water thoroughly mixed together. Immediately below the mixing chamber is a spring balanced chamber for receiving the slurry from the mixing chamber. Removably secured to the bottom of the spring-balanced slurry-chamber is a motor-driven slurry pump for feeding the slurry through a rubber hose to the mold or core boxes. The rubber hose is carried by an extensible and rotatable boom, at the free end of which are controls whereby the operator can shut off flow of the slurry through the hose by a clamping roller. As the flow is thus cut off the weight of slurry in the slurry-chamber increases. The increased weight causes the spring-balanced slurry chamber to move down. This movement actuates electrical controls for slowing down the motor which actuates both the dry plaster metering wheel and the rubber gear pump thus feeding less and less of the dry plaster and water. Should the weight of slurry in the slurry chamber become sufficiently great it causes the spring-balanced chamber to move down to actuate a control to stop entirely the motor feeding the water and dry plaster to the mixing unit.

The rotatable and extensible boom permits filling mold or core boxes on either side of the machine and at varying distances from the slurry chamber. The free end of the boom, in addition to carrying the hose clamping roller, carries control means for moving the entire machine in either direction along the overhead track and also carries control means for stopping the machine.

*Detailed description*

Referring especially to Figures 1A, 1B and 2, 10 indicates an overhead track by means of which the machine is supported and along which the machine is movable. Supporting wheels 11 rest on the track and are mounted for rotation in hanger brackets 12 which in turn are carried by hanger beams 13. To the hanger beams are attached heavy angle irons 14 to which are attached a hopper 15 carrying a supply of the dry plaster mix. Resting on I-beams 16 are rubber-tired traction wheels 17 for moving the machine along the overhead track. The wheels 17 are driven by means of sprockets 18' fixed to a shaft 19 to which the traction wheels are also fixed. The sprockets 18' are driven by sprockets 20 fixed on shaft 21 by means of drive chains 22. Shaft 21 is driven by sprocket 22' also fixed to shaft 21. Sprocket 22' is driven by an electric motor (not shown) by means of chain drive 23.

Figure 5:
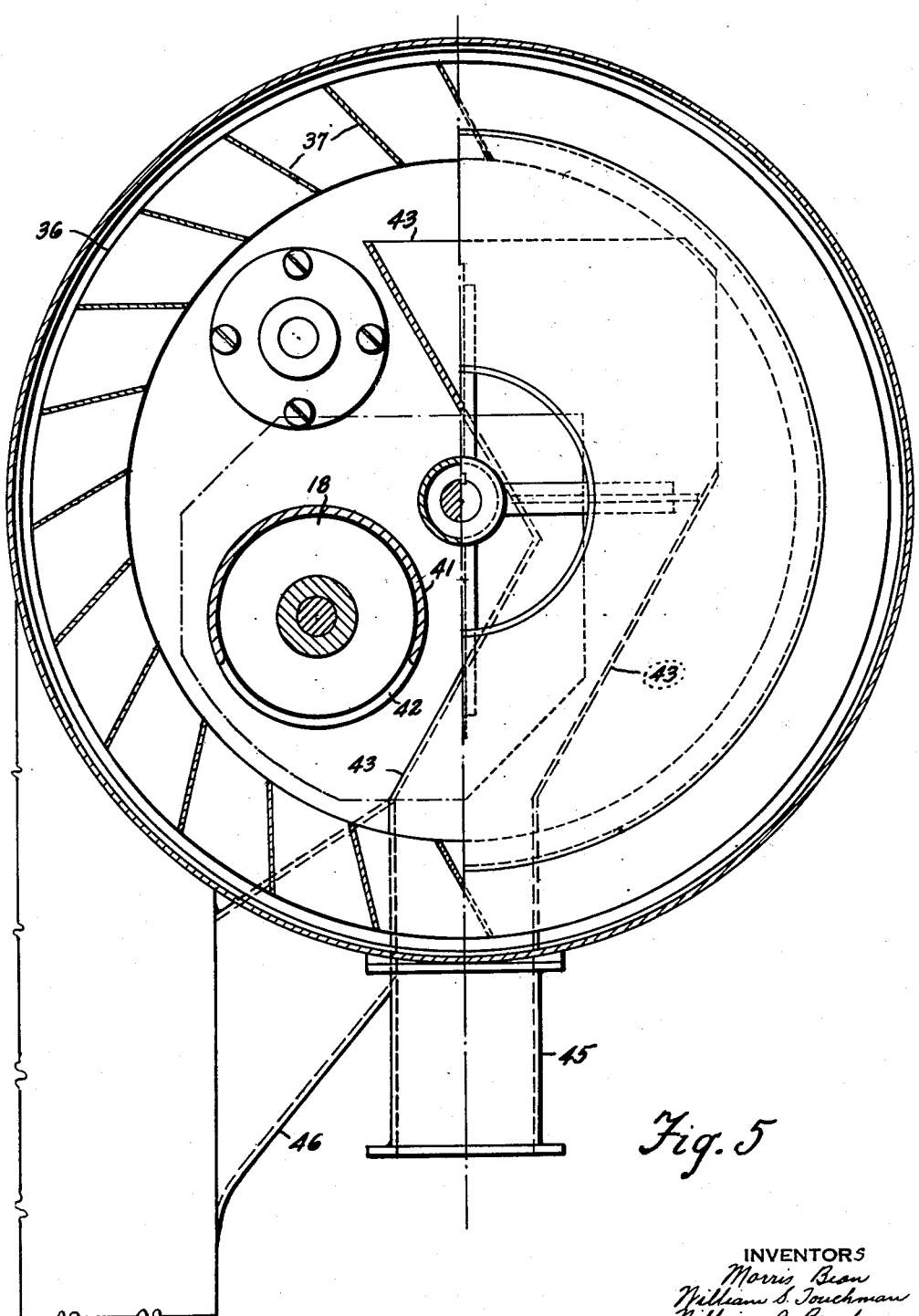
Figure 5 is a view of the fluffing unit illustrated in Figure 4, the right-hand side of Figure 5 being taken on line A—A in Figure 4, and the left-hand side being taken on line B—B in Figure 4.

The dry plaster mix is fed from the hopper by a helical feed screw 18 as shown in Figures 4 and 5. The dry plaster then is fluffed by means of the fluffing unit indicated generally by 25 (see also Figures 1A and 2), then passes through a plaster metering unit indicated generally by 26, then to a wet-cone unit indicated generally by 27, then to a mixing unit indicated generally by 28, then to a slurry chamber indicated generally by 29 and then to a slurry pump unit indicated generally by 30. There is also shown a gear pump unit indicated generally by 31 in Figures 1A and 2 for metering the amount of water.

The fluffing unit 25 is shown in greater detail in Figures 4 and 5. Removably secured to the frame of the machine is an enclosing housing 35. Within the housing is a fluffing wheel 36 having a plurality of angularly arranged blades 37 at the periphery thereof. The fluffing wheel is driven by means of a shaft 38, spider 39 fixed thereto and a frusto-conical housing 40 fixed to the spider and fluffing wheel. The helical feed screw leading from the plaster supply hopper 15 is mounted to rotate in a cylinder 41 having a cut-away portion 42 on the lower side thereof whereby the plaster fed by the screw 18 may drop down in position where it will be picked up by the angularly arranged blades 37 on the periphery of the rotating fluffing wheel. The plaster is carried upward by the blades of the fluffing wheel as it rotates. As the plaster reaches a region at the upper portion of the path of rotation of the fluffing wheel it slides off the angularly arranged blades thereon and drops into a chute 43. The fluffing wheel is for the purpose of making each unit volume of plaster as light in weight as possible and each unit volume of the same weight as each other unit volume. The fluffed plaster drops down the chute 43 into a chamber 45. The capacity of the feed screw 18 and fluffing unit are such that the chamber 45 is always kept full of the fluffed plaster. Excess plaster above that required to keep the chamber 45 filled spills over and falls down a chute 46 where it is picked up by a bucket-elevator 47 enclosed in housing 48 and carried to the top of the elevator, discharged into chamber 49 (Figure 2) and is returned to the plaster supply hopper 15 by means of a helical-feed conveyor 50.

Figure 1A:
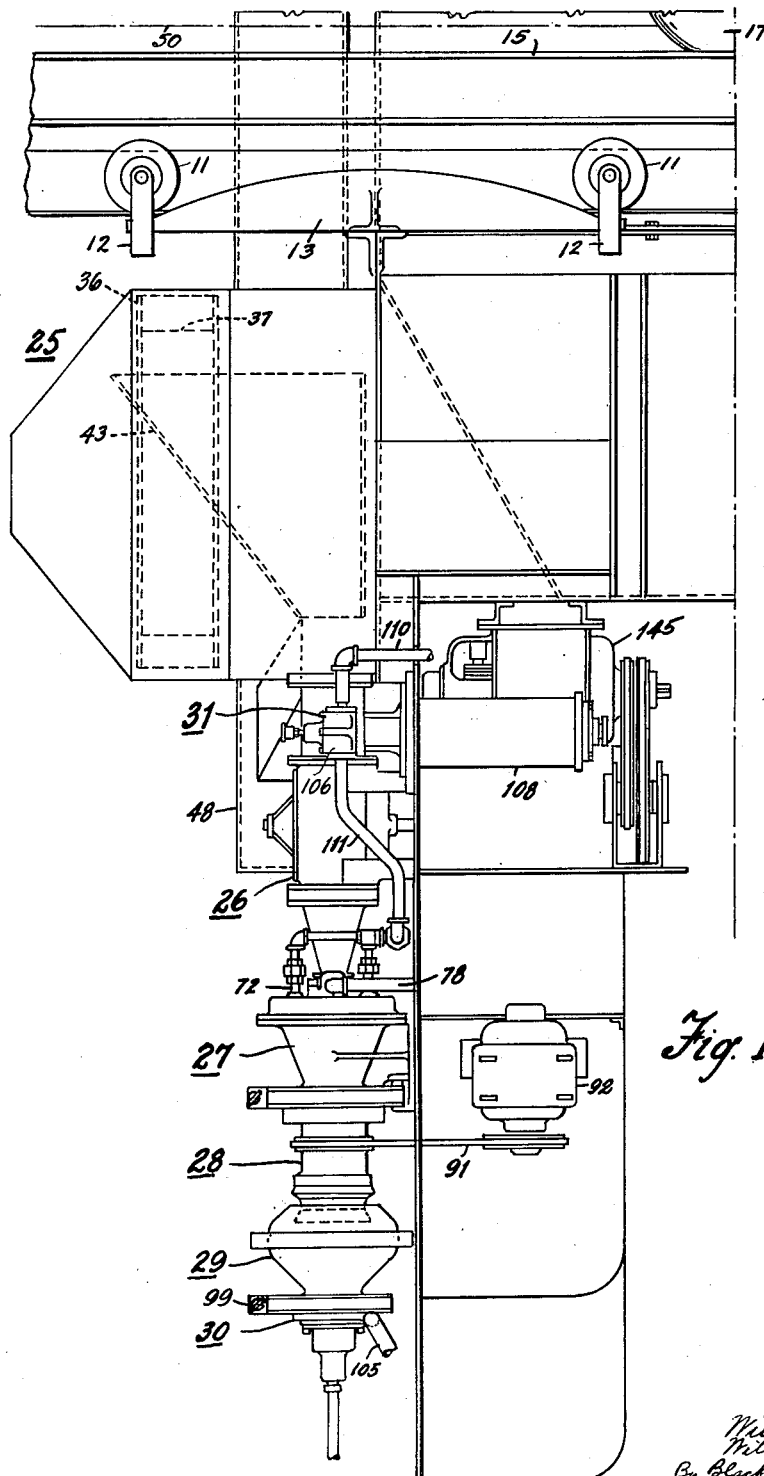
Figure 2:
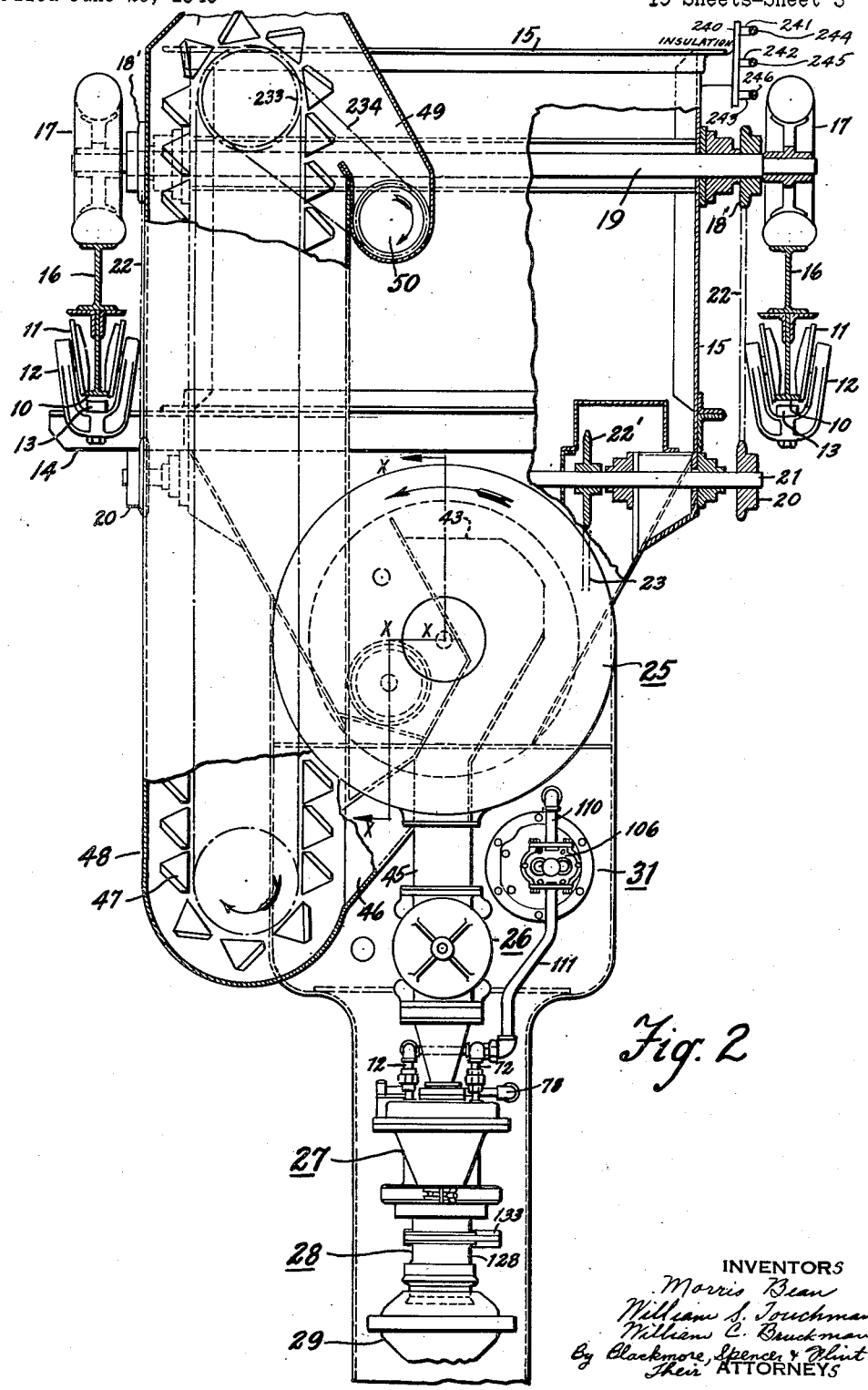
Figure 2 is a front elevational view with parts broken away and parts in section of the machine illustrated in Figures 1A and 1B.
Figure 6:
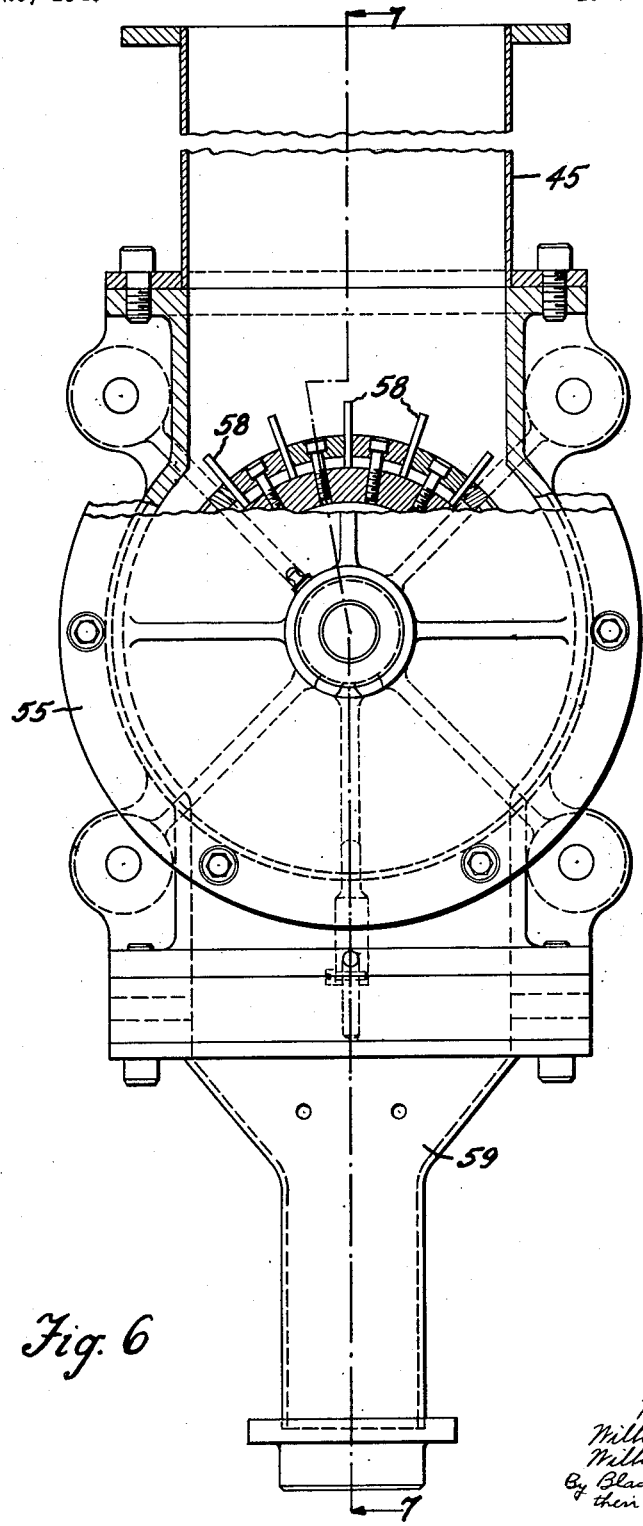
Figure 6 is an elevational view with parts broken away and in section of a metering unit for the dry plaster fed by gravity from the fluffing unit.
Figure 7:
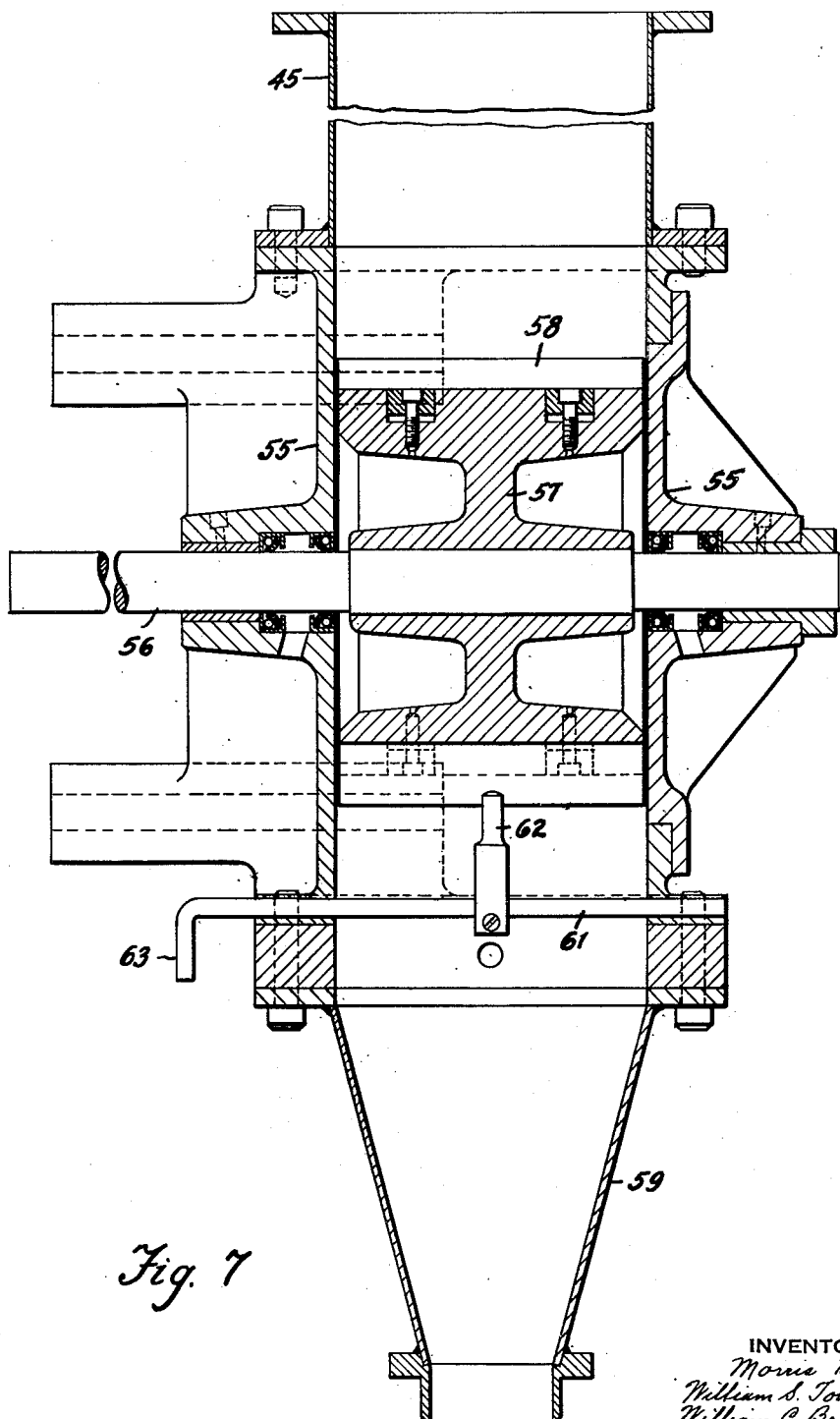
Figure 7 is a sectional view taken substantially on line 7—7 in Fig. 6.

The plaster metering unit 26 is located immediately below the chamber 45 as is seen in Figures 1A and 2. The details of the plaster metering unit are shown in Figures 6 and 7. In these figures there is shown a casing 55 carried by the frame of the machine. Mounted for rotation in the casing 55 is a shaft 56 to which is fixed a wheel 57 having a plurality of similar blades 58 equally spaced on the periphery of the wheel. The wheel and blades carry the fluffed plaster from chamber 45 to the bottom of the wheel where it drops into a chamber or chute 59. Adjacent the lower portion of the periphery of the wheel 57 is a shaft 61 to which is secured a finger 62. The shaft 61 is yieldably and resiliently mounted as by means of the tension of a rubber band or spring (not shown) adapted to be connected to the bent end 63 of the shaft 61 and to a fixed support. The finger 62 extends into the path of rotation of each blade 58 and by means of the yieldable mounting of shaft 61 is moved by movement of the blade until it is out of engagement therewith whereupon the finger is sprung back until it strikes the next blade 58, thus shaking loose any plaster which may tend to adhere to the blade. It will be understood that the plaster is metered by the wheel and that for each rotation thereof the same volume of fluffed plaster is dropped into the chute 59.

From the chute or chamber 59 the dry plaster is ready to pass into the wet-cone unit 27, shown more specifically in Figures 8, 9 and 10. Separating the lowermost portion of the chute 59 and the wet-cone unit 27 is a slide-gate 65 having an opening 66 formed therein adapted to be brought into alignment with the bottom of the chute 59 when it is desired that the dry plaster pass to the wet-cone chamber. When the machine is not being operated the gate is closed. The means for moving the slide-gate comprises an air cylinder 67, piston-rod 68 and arm 69 which moves the slide-gate about a pivot 71. Water enters the wet-cone by means of a plurality of pipes 72 from a water metering means to be described later. The pipes 72 open into an annular chamber 73 from whence the water flows down the tapered wall of the wet-cone by means of a multiplicity of small openings 74 in a flat annular ring 75 adjacent the bottom of the annular chamber 73. Above the annular ring 71 is an annular baffle plate 76. A splash ring 77 of paraffin coated plastic material prevents water from splashing up and wetting the walls of the chute 59. There is also provided a pipe 78 for supplying water for flushing the wet-cone. The entrance of the pipe 78 into the wet-cone is by means of a perforated plug 79 having a splash ring 80 of paraffin coated plastic surrounding the same.

The water and plaster pass downwardly through the wet-cone and enter the mixing unit 28 shown in detail in Figure 8. The mixing unit is removably secured to the bottom of the wet-cone unit by means of a quick-opening clamp 82. The mixing unit includes a hollow stationary cylinder 83 having a plurality of blades 84 fixed thereto. Rotatably supported about the cylinder 83 is a member 86 which is connected at the lower end thereof by a spider 87 to an upwardly extending shaft 88 having a plurality of blades or paddles 89. The member 86, shaft 88 connected therewith and paddles 89 are rotated at high speed by means of a V-shaped pulley 90 formed integral with member 86, belt 91 and electric motor 92 (Figures 1A and 12).

Referring especially to Figures 1A, 2, and 13 the exit end of the mixing chamber extends into the upper portion of a slurry receiving unit indicated generally at 29. Referring especially to Figure 13, the slurry unit includes a chamber formed by a bottom portion 95 and a top portion 96. In the chamber and removably secured thereto are two baffles 97, one of which is shown in Figure 13. The other baffle is 180° from the one shown. Fixed to the slurry chamber are arms 113 and 114 (see Figure 14 also), which are welded to supports whereby the slurry chamber is spring balanced. By differences in the weight of slurry in the chamber because of various possible conditions of operation, motor control means are actuated for slowing down or speeding the feed of dry plaster and water to the mixing unit, and, should the weight of slurry become sufficiently great, stops the motor.

Attached to the bottom of the slurry chamber by means of a quick opening clamp 99 is the slurry pump unit 30 (see especially Figures 1A, 13, 14 and 16). This unit includes a rotatable shaft 100 (driven by a separate electric motor), said shaft having fixed to the upper end thereof a hub 101 having a plurality of curved blades 102 fixed thereto. The hub and blades rotate in a housing 104 and the slurry is fed by the rotating blades into an outlet pipe 103. To this outlet pipe is connected a rubber hose 105 through which the slurry flows to the core or mold box.

The water metering means 31 is shown in Figures 1A, 2 and 11. In these figures is illustrated a gear pump 106 of known type. Preferably the contacting surfaces of the gear teeth of the gear pump are formed of neophrene or the like. For each rotation of the gear pump a constant volume of water is fed. In other words this is a fluid metering device. The gear pump is driven by a shaft 107 mounted for rotation in an enclosed housing 108. The shaft 107 is rotated by means of pulley 109 fixed to the shaft. The inlet of the gear pump is supplied with water by means of pipe 110 which is connected with water supply by a rubber hose (not shown) of sufficient length to accommodate the machine in any position of its travel along the overhead track. The discharge side of the gear pump is connected by pipe 111 to the pipes 72 which lead to the annular entrance chamber 73 above the wet-cone. As later described in detail the water metering pump and the plaster metering wheel are driven from the same electric motor.

The mounting means for the slurry chamber is best seen in Figures 13, 14, 19 and 20. Arms 115 and 116 are fixed at one end of each to the arms 113 and 114, respectively, which support the slurry chamber and extend on each side of the frame of the machine. The opposite ends of the arms 115 and 116 are fixed to a shaft 117, which is mounted for oscillation in brackets 118 and 119 fixed to the frame. Adjustably mounted on and moved by oscillation of a hub 120 on shaft 117 is an arm 121. Fixed to arm 121 is another arm 122 to the free end of which is fixed one end of a helical spring 123. The other end of the spring 123 is connected to a chain 127 passing over a pulley 124 and adapted to move a motor speed control shown diagrammatically at 125. Stops 126 fixed to the frame of the machine are adapted to be engaged by element 128 connected to the spring 123 and chain 127, to prevent movement of motor control 125 beyond the stop position. Arm 121 movable with shaft 117 is connected by a heavy helical spring 130 with an arm 131 carried by disc 132. The disc 132 and arm are spring biased in a clockwise direction as viewed in Figure 19 by means of tension spring 133 connected to one end of a chain 134, the other end of the chain being connected to the periphery of the disc 132. A stop 136 fixed to the frame of the machine engages the arm 131 fixed to the disc 132 and prevents clockwise movement beyond the position shown in Figures 19 and 20. In operation of the machine the slurry chamber is thus spring balanced and as the weight of slurry in the slurry chamber increases, arms 115, 116, and 121 move down against the force of spring 130 and through movement of arm 122 control the speed of rotation of a motor 145 driving the plaster and water metering devices by means of motor control 125.

Referring especially to Figures 1A, 11, 12, 19, 20 and 21, the relationship between the motor for driving both the plaster metering and water metering units and the means whereby the speed of the motor is controlled by the weight of slurry in the slurry chamber will be described more particularly. A direct current motor 145 is provided for driving both the plaster and water metering means. To the rotor shaft of motor 145 is fixed a pulley 146 connected by a belt drive 147 with a large pulley 148 on a jack shaft 149. A small pulley 150 on the jack shaft 149 drives, by means of belt 151, a large pulley 109 on the shaft 107 driving water gear pump 106. A small gear 154 on the shaft 107 drives a large pulley 155 by means of chain drive 156. Pulley 155 is fixed to a shaft 157 leading to the input side of a variable ratio drive unit VRD. The output side of the VRD unit is connected to the shaft 56 driving the plaster metering wheels. The purpose of the several large and small pulleys just described is to rotate the shafts driving the gear pump and the plaster metering wheel at a speed slower than the speed of rotation of the direct current electric motor 145. By means of the drive connections just described the input side of the VRD unit is driven at a slower speed than is the water metering pump. By means of the VRD unit the speed of rotation of the output side can be varied with respect to the input side. Ordinarily the output side rotates at a speed about ¾ that of the input side. It will be understood that for any particular dry plaster mix the VRD unit can be adjusted to vary the ratio of dry plaster fed with respect to the amount of water fed by the metering pump. In other words some dry plaster mixes may require a greater or less proportion of water. Once the VRD unit is adjusted for a particular dry plaster mix it is left in this position of adjustment. Since the water meter shaft and plaster meter shaft are connected together as described and driven from electric motor 145, as the speed of rotation of the motor increases or decreases the metered amounts of plaster and water also increase or decrease. Under conditions of operation of the machine in which the weight of slurry in the slurry chamber 29 increases, the increased weight will cause the chamber to move downward against the force of the spring 130 thus actuating the motor speed control 125. The motor control is such that as the weight of slurry within slurry chamber increases the motor slows down and finally stops entirely should the amount of slurry in the chamber be sufficiently great. As the weight of slurry becomes less the motor is speeded up.

Figures 22–31 inclusive, show a rotatable and extensible boom for supporting the rubber hose 105 for feeding slurry to mold or core boxes and for carrying various control devices. This construction permits filling mold or core boxes on either side of the machine and at variable distances from the machine. The rotatable and extensible boom is carried by a bracket 160 as best seen at the left in Figure 23 which is carried by the frame of the machine. Rotatably supported by the bracket 160 is a support 161 of open-box type construction which supports one end of links 162 and 163, there being a plurality of the links constituting a "lazy-tongs" type of extensible boom. Links 162 are of flat-strip steel and are arranged in pairs, the links of each pair being separated by a link formed of steel or iron pipe. Figure 25 illustrates the rotatable connection 164 between the bracket 160 and the support 161. Figure 26 shows the manner in which the left hand link 163 is mounted in the support 161. Figure 27 shows the manner in which the ends of the left-hand pair of flat links 162 are mounted in the support 161. Fixed to the inner faces of the sides of support 161 are channels 170. In the channels are rollers 171 on the ends of a rod 172 which pass through the ends of the pair of links 162. The channel, rod and rollers permit the lower ends of the left-hand pair of links 162 to move up and down as a unit as the boom is extended or retracted. Figure 23 shows the relative position of the links 162 with respect to the support 161 when the boom is extended completely. Figure 28 illustrates one of the pivotal connections between a pair of the links 162 and a link 163. A sleeve 175 passes through an opening in the link 163 and is welded to the link. The inner ports of the ends of the sleeve support ball bearings 176 which permit relative movement between the sleeve and a pin 177 which passes through a pair of the links 162. The right-hand pair of links 162 and the right-hand link 163 are connected to a support 180 which in turn is pivotally connected to a housing 181 carrying various control devices (see Figures 23 and 29). Figure 24 shows the connection between the pair of links 162 and the support 180, as well as a rotatable connection between the housing 181 and support 180. The outer ends of the right-hand pair of links (see also Fig. 23) are connected to a pin 182, the ends 183 of which are supported by ball bearings 184 in fixtures 185 secured to the support 180. By means of the headed-screw 186 and roller bearing 187 the housing 181 is rotatably mounted relative to support 180.

The housing 181 is enlarged near the lower end thereof and is cut-away at 190 to accommodate a handle 191 (see especially Figure 29). The handle is rotatably mounted by ball bearings 192 and 193 in a hollow support 194. Rotation of handle 191 a partial revolution in one direction from neutral position brings movable switch element 195 into contact with switch element 196 (Figure 30) to complete an electrical circuit to an electric motor for moving the entire machine in one direction along the track. Rotation of the handle in the opposite direction from neutral position similarly closes contacts 197 and 198 to reverse the motor to move the entire machine along the overhead track in the reverse direction. The hollow support 194 carrying handle 191 is pivotally mounted in housing 181. An arm 205 movable with the hollow support 194 carries a hose-clamping roller 206. Downward movement of the handle 191 from the broken line position to the full line position shown in Figure 29 causes the roller 206 to squeeze the hose 105 against element 207 carried by the housing 181 to partially or entirely shut off flow of slurry in the hose. Figure 31 shows the positions of the roller and hose when the flow of slurry is cut off entirely. An arm 208 movable with hollow support 194 is biased by a helical spring 209 in a counterclockwise direction as viewed in Figure 29. Clockwise movement of arm from the position indicated in Figure 29 brings the free end of the arm into contact with a movable element 210 of a micro-switch 211 controlling a motor circuit which stops the machine.

In Figures 1B, 2 and 3 are illustrated means for driving the screw feeding means 18 and 50 and an agitating means for preventing plaster from becoming packed in the hopper above the screw conveyor 18. An electric motor 220 drives a shaft 221 through a speed reducing means 222. Fixed to the shaft 221 are sprockets 223 which drive larger sprockets 224 by means of chain drives 225. The sprockets 224 are fixed to the shaft 38 driving the fluffing wheel 36. A gear 226 is rotatable with the sprocket 224 and drives a gear 227 for turning the feed screw 18. Gear 226 also drives a gear 228 for driving an agitator shaft 229 (Fig. 4). The agitation is provided by a plurality of arms (not shown) carried by the shaft 229 which extend radially of the shaft at different points thereon. The purpose of the arms is to prevent the plaster from packing down and forming an arch above the screw 18 which feeds plaster from the hopper to the fluffing wheel. Rotating with gear 228 is a sprocket 229' connected by a chain drive 230 with a sprocket 231 for rotating the screw feed return 50. A sprocket 233 for the bucket elevator 47 is rotated by chain 234 driven by rotation of screw feed 50 as indicated in Figure 2.

At the upper right in Figure 2 is shown a bracket 240 carrying brushes 241, 242 and 243, engaging wires 244, 245 and 246 respectively, of a source of electric current whereby electric current is fed to the several motors and controls.

Since the plaster sets relatively soon after it has been mixed with water, it is necessary to remove the slurry from the machine before it sets therein. During normal operation as soon as one mold or core box is filled the operator will move handle 191 downward to move roller 206 to squeeze the hose 105 against the flat surface 207 thus shutting off flow of slurry therein. The end of the hose is then moved to another mold or core box and the handle moved upward to unclamp the hose thus allowing the slurry to flow therethrough. Usually the clamping and unclamping operations occur quite close together and there is not a great increase in the weight of slurry in the slurry chamber. However as above described the increased weight of slurry in the chamber will slow down the direct current motor driving the plaster and water metering devices. Should the hose be shut off for any great length of time the weight of slurry will increase to the point where it will shut off the motor metering the water and plaster. In practice a warning buzzer (not shown) is provided to warn the operator to unclamp the hose should it be closed so long that there is danger of the slurry setting up in the hose, slurry pump, slurry pump chamber, etc. When the machine is shut down after a period of operation it is necessary to thoroughly rinse the machine to remove the wet plaster therefrom. By means of a valve controlled by a solenoid or other suitable means (not shown) water is caused to enter the wet-cone through the pipe 78 to thoroughly flush the wet-cone, mixer, slurry chamber, slurry pump and hose. Under certain abnormal conditions of operation it may be necessary to provide for an emergency rinse even though the plaster and water metering devices are still in operation. Separate control devices may be provided for this purpose.

We claim:

1. In a plaster mixing machine, a rotatable fluffing wheel having angularly arranged blades at the periphery thereof for picking up plaster and carrying it to a position at the upper portion of the path of rotation of the wheel where it drops off the blades, a chute for receiving plaster which drops off the blades of the fluffing wheel, a chamber receiving fluffed plaster from the chute, a plaster metering wheel for feeding fluffed plaster from the chamber, a gear pump for metering and feeding water to be mixed with the metered plaster, means for driving both the plaster metering wheel and the gear pump from the same power source whereby both metering devices speed up or slow down together and the relative proportions of plaster and water remain the same, means for thoroughly mixing the metered plaster and water to form a slurry therefrom, a slurry chamber for receiving the slurry from the mixing means, means for slowing down the driving means for the plaster metering wheel and the gear pump when the weight of slurry in the slurry chamber increases and for speeding up the driving means when the weight of slurry in the slurry chamber decreases, and means for feeding slurry from the slurry chamber.

2. In a plaster mixing machine, a supply hopper for plaster, means for feeding plaster from the hopper, a rotatable fluffing wheel having angularly arranged blades at the periphery thereof for picking up plaster fed from the hopper and carrying it to a position at the upper portion of the path of rotation of the wheel where it drops off the blades, a chamber receiving fluffed plaster from the fluffing wheel, means for returning to the hopper plaster in excess of that required to keep the fluffed plaster receiving chamber filled, means for metering and feeding fluffed plaster from said chamber, means for metering and feeding water and means for thoroughly mixing the metered plaster and water.

3. In a plaster mixing machine, a supply hopper for plaster, means for feeding plaster from the hopper, means for fluffing plaster fed from the hopper, a chamber receiving fluffed plaster from the fluffing means, means for returning to the hopper fluffed plaster in excess of that required to keep said chamber full, means for metering and feeding plaster from said chamber, a water metering means, a cone-shaped passage, the walls of which are wetted by water from the metering means and through which the plaster passes, a mixing means receiving plaster and water from the cone-shaped passage and thoroughly mixing them to form a slurry therefrom, a spring-balanced slurry chamber receiving slurry from the mixing means, control means for slowing up the water and plaster metering means as the weight of slurry in the slurry chamber increases and for speeding up the water and plaster metering means as the weight of slurry decreases, and means for feeding slurry from the slurry chamber.

4. In a plaster mixing machine, a plaster fluffing means, plaster metering means for feeding metered amounts of fluffed plaster, water metering means for feeding metered amounts of water, means for driving both the plaster and water metering means from the same power source whereby both metering means may speed up or slow down together and the relative proportions of fluffed plaster and water remain the same, means for receiving the metered plaster and water and thoroughly mixing the same to form a slurry therefrom, a slurry chamber for receiving the slurry from the mixing means, and means controlled by the weight of slurry in the slurry chamber for slowing down said driving means for the plaster and water metering means as the weight of slurry in the slurry chamber increases and for speeding up said driving means when the weight of slurry in the slurry chamber decreases.

5. In a plaster mixing machine, plaster metering means for continuously metering and feeding fluffed plaster, water metering means for continuously feeding metered amounts of water, means for continuously driving both the plaster and water metering means from the same power source whereby both the plaster and water metering means may speed up or slow down together and the relative proportions of fluffed plaster and water remain the same, continuously actuated means for thoroughly mixing said metered plaster and water to form a slurry, a slurry chamber for receiving slurry from the mixing means, a continuously rotating slurry pump for feeding slurry from said chamber, a collapsible hose leading from the outlet side of said slurry pump, means for clamping said hose whereby flow of slurry is shut off and the weight of slurry in said slurry chamber increases, and means actuated by an increase in the weight of slurry in said slurry chamber for slowing down said means for continuously driving said plaster and water metering means.

6. In a plaster machine, a rotatable fluffing wheel havnig angularly arranged blades at the periphery thereof for picking up dry plaster and carrying it to a position at the upper portion of the path of rotation of the wheel where it drops off the blades, a chamber receiving fluffed plaster from the fluffing wheel, a continuously rotating plaster metering wheel for feeding fluffed plaster from said chamber, a continuously rotating gear pump for metering and feeding water, means for rotating both the plaster metering wheel and the rotary gear metering pump from the same power source whereby both metering means speed up or slow down together so that the relative proportions of fluffed plaster and water remain the same under variable conditions of operation and means for thoroughly and continuously mixing the metered plaster and water.

7. In a plaster mixing machine, a slurry chamber, a slurry pump for pumping slurry from said chamber, a hose connected to the outlet of the slurry pump, a rotatable and extensible boom for supporting the hose, and means carried by the free end of said boom for squeezing the hose to shut off flow of slurry through said hose.

MORRIS BEAN.
 WILLIAM S. TOUCHMAN.
 WILLIAM C. BRUCKMAN.

REFERENCES CITED

The following references are of record in the file of this patent:

UNITED STATES PATENTS

| Number | Name | Date |
| --- | --- | --- |
| 735,530 | Kuhne | Aug. 4, 1903 |
| 1,348,222 | Holmes | Aug. 3, 1920 |
| 1,483,048 | Sturtevant | Feb. 5, 1924 |
| 1,626,830 | Horst | May 3, 1927 |
| 1,788,345 | Skirvin | Jan. 6, 1931 |
| 1,969,533 | Pipes et al. | Aug. 7, 1934 |
| 1,999,797 | Bagley et al. | Apr. 30, 1935 |
| 2,073,567 | Sciarra | Mar. 9, 1937 |
| 2,276,237 | Lowry | Mar. 10, 1942 |
| 2,381,505 | Lindholm | Aug. 7, 1945 |
| 2,408,221 | Michel | Sept. 24, 1946 |

FOREIGN PATENTS

| Number | Country | Date |
| --- | --- | --- |
| 40,508 | Sweden | Mar. 24, 1913 |